United States Patent
Skotty

(10) Patent No.: US 9,670,034 B2
(45) Date of Patent: Jun. 6, 2017

(54) POWER AIR COMPRESSOR

(71) Applicant: The Chamberlain Group, Inc., Elmhurst, IL (US)

(72) Inventor: Brian Roy Skotty, Elmhurst, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 0 days.

(21) Appl. No.: 14/699,624

(22) Filed: Apr. 29, 2015

(65) Prior Publication Data

US 2015/0308425 A1 Oct. 29, 2015

Related U.S. Application Data

(60) Provisional application No. 61/985,968, filed on Apr. 29, 2014.

(51) Int. Cl.
| | | |
|---|---|---|
| *F16L 11/22* | (2006.01) | |
| *F16L 39/00* | (2006.01) | |
| *F16L 9/19* | (2006.01) | |
| *B60S 5/04* | (2006.01) | |
| *F16L 3/01* | (2006.01) | |

(Continued)

(52) U.S. Cl.
CPC ............ *B65H 75/4478* (2013.01); *B60S 5/04* (2013.01); *F04B 35/04* (2013.01); *F04B 35/06* (2013.01); *F04B 41/02* (2013.01); *F16L 3/012* (2013.01); *F16L 9/19* (2013.01); *F16L 11/22* (2013.01); *F16L 39/00* (2013.01); *F16L 39/005* (2013.01); *F16L 39/02* (2013.01); *B08B 2203/0276* (2013.01); *B65H 2701/33* (2013.01); *Y10T 137/6899* (2015.04); *Y10T 137/6918* (2015.04); *Y10T 137/6932* (2015.04); *Y10T 137/6954* (2015.04); *Y10T 137/6958* (2015.04); *Y10T 137/6962* (2015.04)

(58) Field of Classification Search
CPC ......... Y10T 137/6918; Y10T 137/6899; Y10T 137/6932; Y10T 137/6943; Y10T 137/6962; Y10T 137/6958; Y10T 137/6954; B65H 75/4478; B65H 2701/33; F16L 3/012; F16L 11/22; F16L 9/19; F16L 39/00; F16L 39/02; F16L 39/005; B08B 2203/0276; B60S 5/04

See application file for complete search history.

(56) References Cited

U.S. PATENT DOCUMENTS

| 1,907,126 A | 5/1933 | Scofield | |
|---|---|---|---|
| 2,481,760 A * | 9/1949 | Leher | B44D 3/166 126/271.1 |

(Continued)

FOREIGN PATENT DOCUMENTS

WO  3301156  3/1983

*Primary Examiner* — Atif Chaudry
(74) *Attorney, Agent, or Firm* — Fitch Even Tabin & Flannery LLP

(57) ABSTRACT

A self-retracting air compressor assembly includes a motorized pump device that drives in opposing directions. A reservoir tank is in fluid communication with the pump device and stores air pumped by the pump device. The air compressor includes a cord assembly that supplies air and electrical power from the pump device. The air compressor assembly pumps air when the motor is driving in a pumping direction, and self-retracts the cord assembly when the motor is driving in a winding direction.

22 Claims, 9 Drawing Sheets

(51) Int. Cl.
*B65H 75/44* (2006.01)
*F04B 35/06* (2006.01)
*F04B 35/04* (2006.01)
*F04B 41/02* (2006.01)
*F16L 39/02* (2006.01)

(56) References Cited

U.S. PATENT DOCUMENTS

| | | | |
|---|---|---|---|
| 3,079,510 A | 2/1963 | Hartwig | |
| 3,895,764 A * | 7/1975 | Roland | A61G 15/16 |
| | | | 242/378.2 |
| 4,380,437 A * | 4/1983 | Yarborough, Jr. | F41G 3/2655 |
| | | | 42/106 |
| 4,490,624 A | 12/1984 | Luker | |
| 4,572,228 A * | 2/1986 | Larson | G01M 3/2853 |
| | | | 137/15.11 |
| 4,576,337 A * | 3/1986 | Post | B65H 75/4489 |
| | | | 137/355.12 |
| 4,835,410 A | 5/1989 | Bhagwat | |
| 4,910,790 A | 3/1990 | Kershaw | |
| 5,925,999 A | 7/1999 | Lakerdas | |
| 6,082,630 A * | 7/2000 | Bohrer | B05B 9/0403 |
| | | | 134/167 C |
| 6,172,437 B1 | 1/2001 | Du | |
| 6,376,767 B1 * | 4/2002 | Knudsen | G01V 1/02 |
| | | | 138/137 |
| 6,920,718 B2 | 7/2005 | Hom | |
| 6,964,569 B2 * | 11/2005 | Nordmo | A61C 1/0084 |
| | | | 433/88 |
| 7,105,969 B2 | 9/2006 | Simofi-Ilyes | |
| 2004/0243068 A1 * | 12/2004 | Noles, Jr. | B05C 7/08 |
| | | | 604/234 |
| 2005/0186041 A1 * | 8/2005 | Oda | B23Q 11/005 |
| | | | 408/56 |
| 2015/0059861 A1 * | 3/2015 | Moore | B65H 75/42 |
| | | | 137/15.08 |
| 2016/0025246 A1 * | 1/2016 | Nelson | F16L 11/10 |
| | | | 285/8 |

* cited by examiner

POWER AIR COMPRESSOR

RELATED APPLICATIONS

This application claims the benefit of U.S. provisional application No. 61/985,968 filed Apr. 29, 2014, titled "Power Air Compressor," which is incorporated by reference in its entirety herein.

TECHNICAL FIELD

The present disclosure generally relates to powered air compressors. More specifically, the present disclosure relates to powered air compressor devices with a self-retractable integrated cord.

BACKGROUND

Powered air compressors can be large, bulky, and heavy. As a result, powered air compressors are often cumbersome and difficult to store, transport, and operate. Further, powered air compressors can have several attached lines, such as air/fluid hoses, power cords, and the like. These lines can be difficult to keep organized and can cause the air compressor to take up even more storage space. Moreover, during operation, the various lines and cables needed to operate the air compressor can become tangled and serve as obstacles to the user.

SUMMARY

The present disclosure describes examples of a self-retracting air compressor. In one example, the air compressor includes a pump device with a motor. The motor can drive in multiple opposing directions. For example, the motor can drive in a "pumping" direction, as well as an opposing "winding" direction. A reservoir tank is in fluid communication with the pump device and stores fluid, such as air pumped by the pump device. The air compressor also includes a cord assembly that supplies air and electrical power from the pump device. The cord assembly includes a fluid hose and a power cord with a jacket that surrounds all or a portion of the hose and power cord. In this manner, the cord assembly handles as a single cable or cord.

In an example of operation, the air compressor assembly pumps air when the motor is driving in the pumping direction. The pumped air can be stored, for example, in the reservoir tank. In another example of operation, the air compressor assembly self-retracts the cord assembly when the motor is driving in a winding direction. For example, the air compressor assembly can wind the cord assembly around the air compressor when the motor is driving in the winding direction.

In another example, an air compressor assembly includes a torus-shaped reservoir tank that circumscribes the pump and a spool surface surrounding the air compressor. A drive system with a drive belt controls winding of the cord assembly about the spool surface. A structural frame positioned about the air compressor has a contact surface in proximity with the drive system.

In an example of operation, the drive system engages with the contact surface of the frame while the motor operates in the winding direction. Thus, operating the pump in the winding direction causes the spool surface to rotate about the center axis of the air compressor to effect winding of the cord assembly about the spool surface. The drive system also disengages with the frame when the motor operates the pumping direction so that the spool does not rotate while the compressor is pumping pump air.

DETAILED DESCRIPTION

The present disclosure describes various examples of a self-retracting air compressor assembly. In one example, an air compressor includes a motorized pump and an associated cord assembly. The cord assembly delivers both air pumped by the compressor, and electric power from a high-voltage power source between ends of the cord, but handles as a single cord/cable.

The motorized pump has a motor that operates in two different directions. While operating in a "pumping" direction, the motor causes the pump to pump air. While operating in an opposite "winding" direction, the motor causes the cord assembly to self-retract. For example, the air compressor (or components thereof) can rotate about a central axis so that when the motor operates in the winding direction, the air compressor (or components thereof) rotates about the central axis, thereby winding the cord assembly around the air compressor.

In this manner the air compressor assembly provides both air and electrical power (among other optional features) in the convenient form of a single cable, thereby limiting tangling and other related issues. The air compressor assembly also conveniently self-retracts, or winds the cord assembly about itself, so that the air compressor assembly can be conveniently stored and transported to and from worksites without multiple cords, hoses, or cables hanging or tangling with one another. The various motorized features can be provided using only a single motor to reduce bulk and weight.

Figure 1:
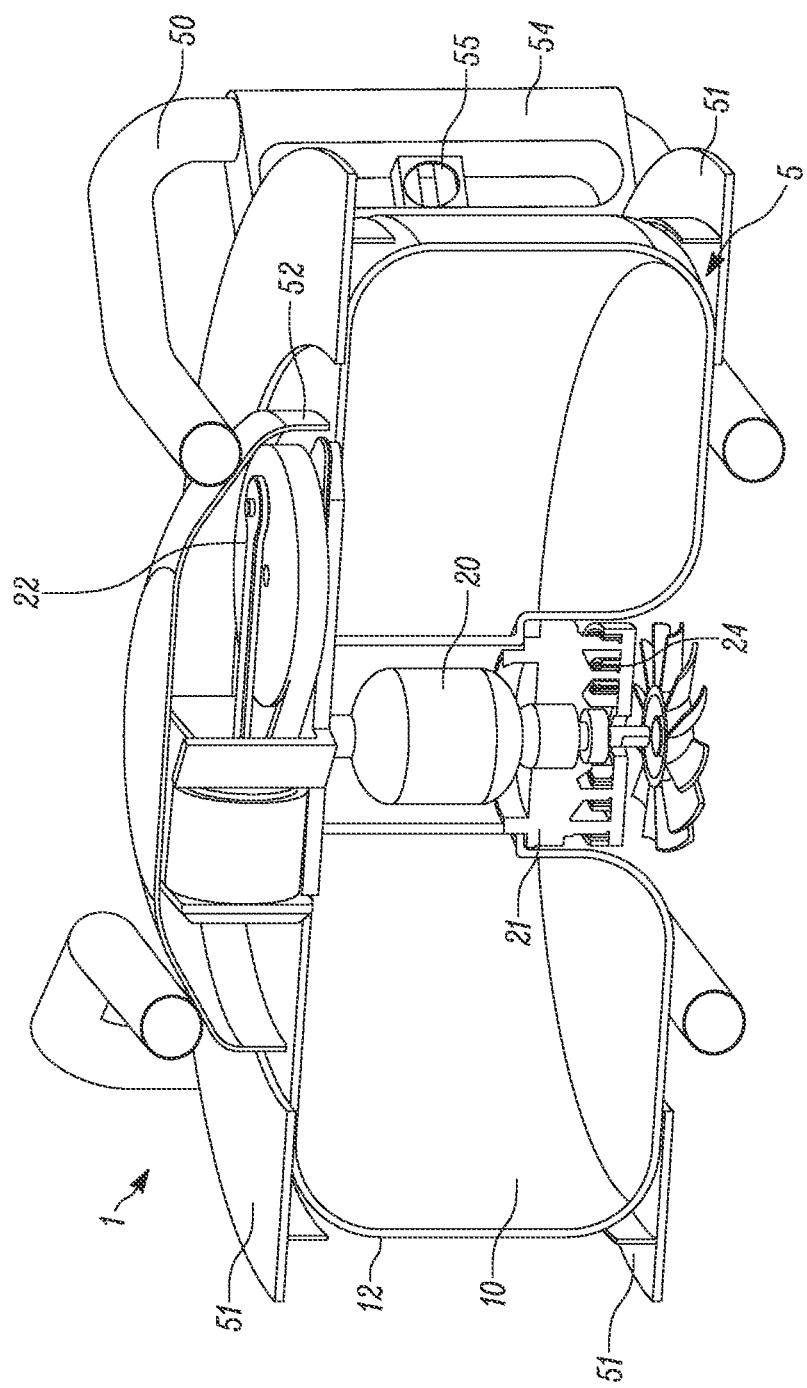
FIG. 1 is a cross sectional view of a self-retracting air compressor assembly in accordance with at least one example of the present disclosure.

FIG. 1 shows a cross section of an example air compressor assembly 1 that can provide air and electrical power via a self-retracting cord assembly (e.g., an air hose and power cord assembly). The air compressor assembly 1 includes an air compressor 5, which may also be referred to as a pump/tank assembly. The air compressor 5 includes an air reservoir tank 10 that stores air and a motorized pump 20 that pumps air. The tank 10 is in fluid communication with the pump 20 so that air pumped by the pump 20 can be stored within the tank 10.

A structural frame 50 is positioned around or about the air compressor 5 and offers structural support to the air compressor assembly 1. A cord assembly 30 (shown in FIGS. 3A and 3B) attaches to the air compressor 5 to deliver air, fluid, electrical power, and/or other functionality from the air compressor 5 to an end of the cord assembly 30. The cord assembly 30 can self-retract by winding around the air compressor 5 so that the air compressor assembly 1 can be stored and/or transported in a convenient compact configuration without unnecessary hanging cords or cables.

In some examples, the tank 10 surrounds or circumscribes the pump 20 such that the pump 20 resides about the center of the tank 10. To facilitate such an arrangement the tank 10 may be a torus shape (e.g., a donut or three-dimensional ring shape) that generally includes an enclosed region that surrounds a center void space and a central axis of the air compressor 5. The torus shape may resemble a cylinder or other shape with an outer peripheral edge that circumscribes a central axis and a hole or void through the central axis of the shape (e.g., a donut hole).

The torus shape of the tank 10 optimizes the size of the air compressor 5 while also providing an axis about which the tank 10, the air compressor 5, or other objects can rotate. For example, the tank 10 and/or the air compressor 5 can be configured to rotate about a central axis running through the center of the void space of the torus-shaped tank 10.

A spool surface 12 surrounds the outer periphery of the tank 10 and/or the air compressor 5. In some examples the spool surface 12 is the outer peripheral surface of the air reservoir tank 10 and/or the air compressor 5. In other examples, the spool surface 12 is a separate surface attached to the tank 10 and/or air compressor 5. In still further examples the spool surface 12 is separate from the tank 10 and/or air compressor 5 such that the spool surface 12 can rotate about the central axis independent of the tank 10 and/or air compressor 5.

The spool surface 12 can have a shape, texture, or other configuration that allows one or more cables to be wound around the spool surface 12, such that the air compressor assembly 1 can be stored in a convenient retracted, or "wound up" configuration.

Figure 3A:
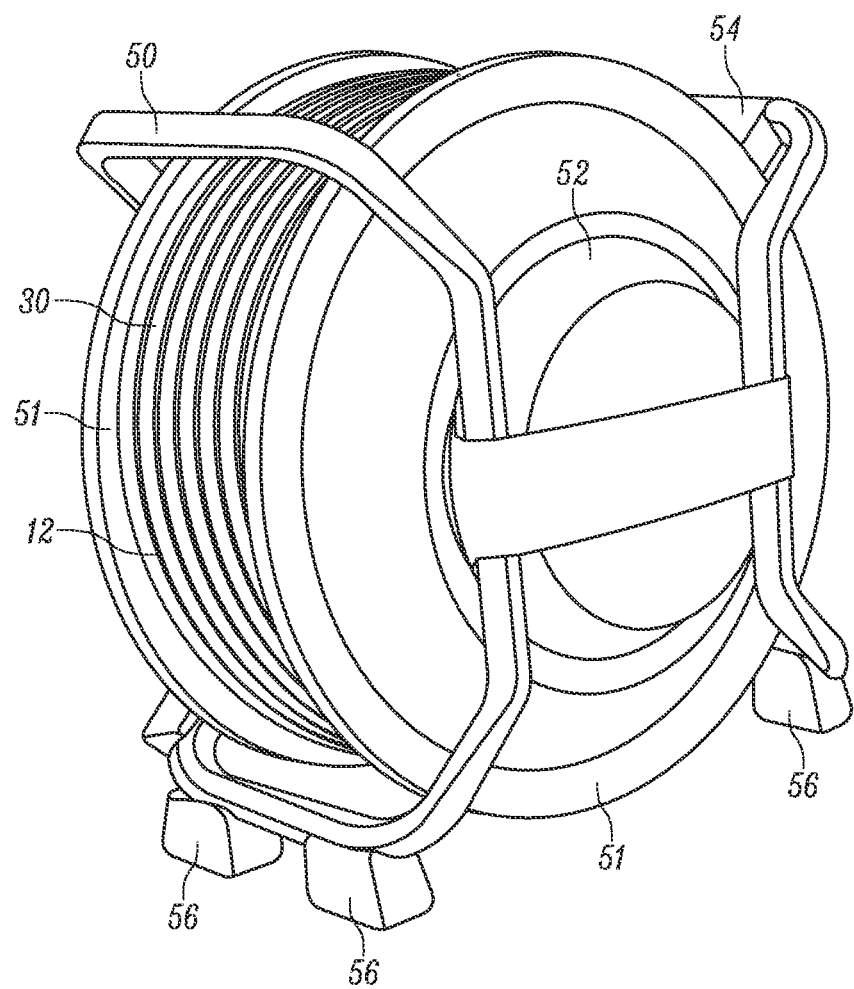
FIG. 3A shows an example air compressor assembly standing in a vertical position with a cord assembly wound around a spool surface.
Figure 3B:
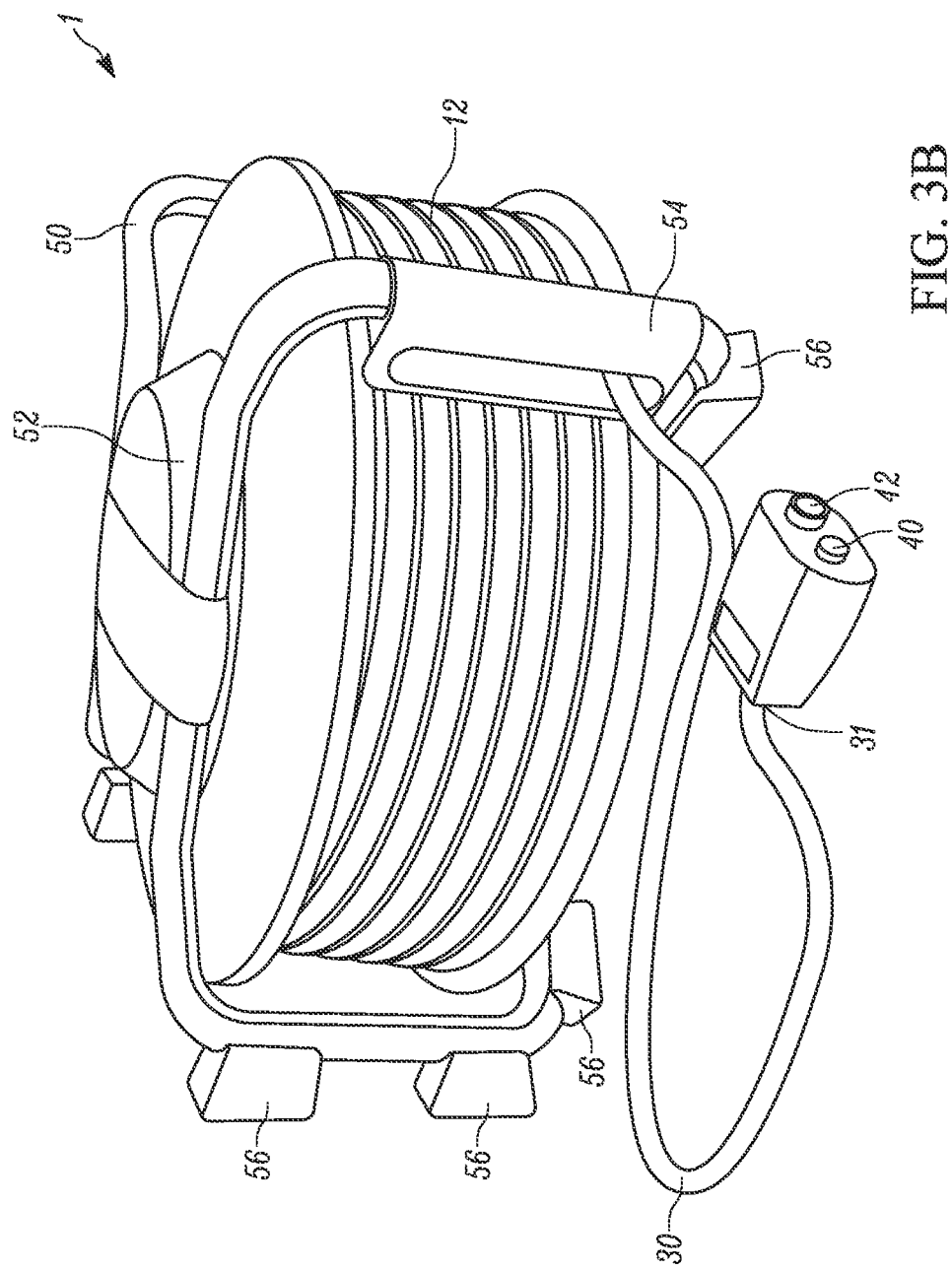
FIG. 3B shows an example air compressor assembly lying in a horizontal position with a cord assembly partially unwound from the spool surface.

The spool surface 12 can have a width wide enough to receive several layers of cable or a cord assembly (e.g., cord assembly 30 as shown in FIGS. 3A and 3B). For example, the spool surface 12 may be wide enough to accommodate ten or more adjacent vertical layers of wound cable so that the entire cord assembly of the air compressor 5 can wind around the spool surface 12.

In some examples, the air compressor assembly 1 may further include a spool cover 51, which may be a part of frame 50, that guides and retains a cord on the spool surface 12. The spool cover 51 inhibits the wound cable from unwinding or otherwise slipping off the spool surface 12. For example, the spool cover 51 helps maintain a wound portion of the cord assembly 30 in contact with the spool surface 12 of the air compressor assembly 1.

A motorized pump 20 is positioned in the center of the air compressor 5, for example, in the hole or void of a torus-shaped tank 10. That is, the pump 20 can be positioned about the center axis of the air compressor 5.

Motorized pump 20 includes a motor that can drive in multiple directions. In one example, the motor drives in a first or "pumping" direction. When the motor operates in the pumping direction, the pump operates to compress air, for example, in a manner consistent with that of common air compressors.

The motor can also operate in a second or "winding" direction. When the motor operates in the winding direction, the motor causes the spool surface 12 to rotate, for example, in a clockwise or counterclockwise direction about the center axis of the air compressor 5. In some approaches, the rotation of the spool surface 12 can result from rotation of the tank 10 and/or the air compressor 5 about the central axis (e.g., because the spool surface is attached to, or a part of the tank 10 or compressor 4). In other approaches, the spool surface 12 is distinct and rotates independently of the tank 10 and/or air compressor 5.

Figure 2:
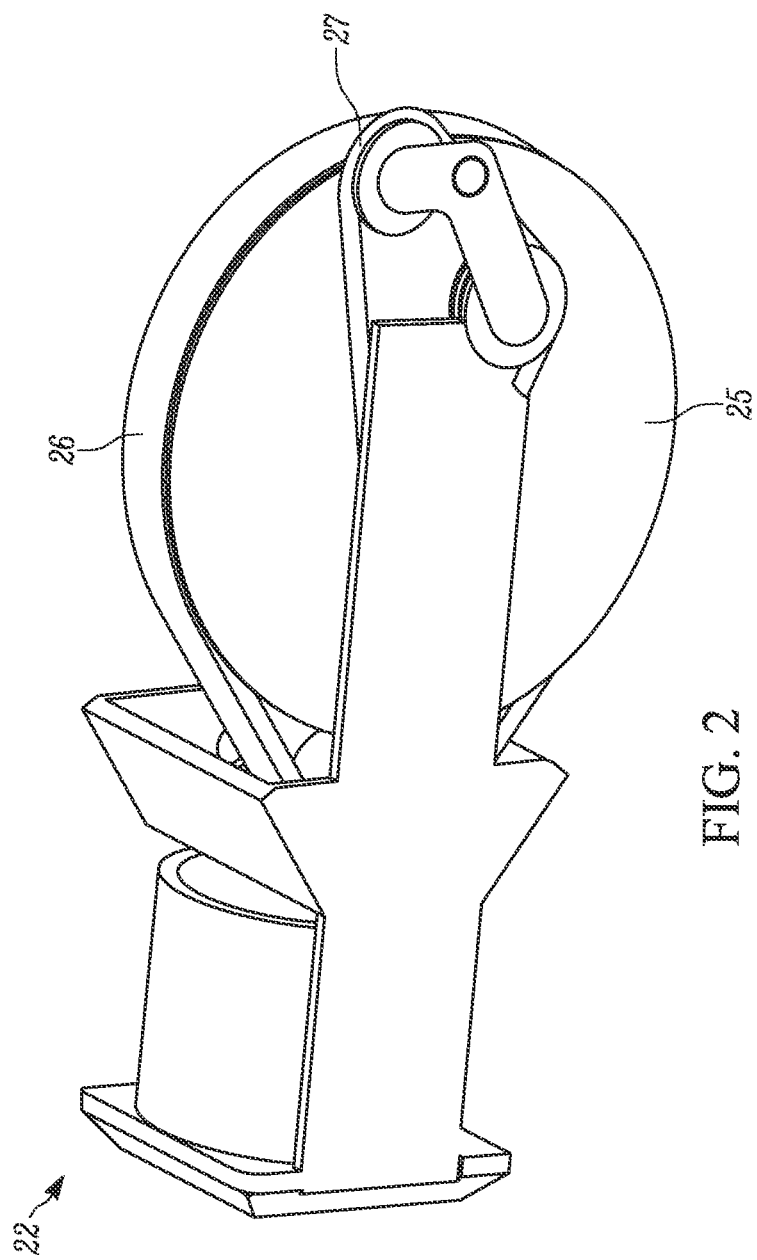
FIG. 2 shows a drive system used in connection with one example of a self-retracting air compressor assembly.

In some examples, the air compressor assembly 1 includes a drive system 22 that controls the rotation of spool surface 12. The drive system 22 can be a part of, or can operate in connection with, the motor of the motorized pump 20. An example drive belt system 22 is shown in more detail in FIG. 2.

Some examples of the drive belt system 22 include a drive pulley 25 with a first drive belt 27 such as a tension belt. The first drive belt 27 is mechanically arranged to operate in connection with the motor of the motorized pump 20. That is, when the motor is operating, the drive belt 27 engages with the motor and rotates while the motor operates.

In operation, the drive system 22 functions to engage the drive belt 27 with the frame 50 of the air compressor assembly 1 while the motor of the pump 20 is operating in the winding direction. For example, when the motor operates in the winding direction, the drive system 22 will cause the drive belt 27 to engage on a contact surface 52 (e.g., a rounded surface or an inner surface of a cylinder-shaped portion) of the frame.

While engaged, the operating motor causes the drive belt 27 to turn on the contact surface 52, thereby effecting rotation of the spool surface 12 on the perimeter of the air compressor 5. For example, the drive belt 27 can cause the tank 10 to rotate about the center axis of the air compressor, thereby rotating a spool surface 12 attached to, or a part of the air compressor 5.

Conversely, when tension is provided in an opposite direction (e.g., when the motor is operating in the pumping direction), the drive belt 27 pulls away from and disengages the frame 50. In this manner the spool surface 12 will remain stationary when the pump operates in the pumping direction.

In another example, the spool surface 12 can be separate and rotate independently from the tank 10 and/or air compressor 5. In such an example, the spool surface 12 can be connected to the contact surface 52, which in turn is rotatably hinged (e.g., via an axle) to the frame 50. In this manner, when the drive belt 27 engages the contact surface 51, the contact surface 51—and thus the attached spool surface 12—rotate with respect to the central axis of the air compressor 5. Such a configuration can be useful, for example, to inhibit wear on certain features of the air compressor 5 (e.g., the brush assembly 24).

Some examples of drive system 22 include a spring mechanism (not shown) that prevents the drive pulley 25 and/or the drive belt 27 from engaging with the frame 50 while the motor is not running. Accordingly, when the motor of the pump 20 is not operating (e.g., neither pumping nor winding), the drive system 22 disengages from the contact surface 52 and/or the frame 50.

As noted, when the motor is operating in the winding direction, the drive system 22 engages contact surface 52 of the frame 50 so that the spool surface 12 rotates with respect to the air compressor assembly 1. This rotation of the spool surface 12 allows a hose or a cord assembly 30 associated with the air compressor assembly 1 (shown in FIGS. 3A and 3B) to self-retract, for example, by winding around the spool surface 12.

In some examples, the air compressor assembly 1 will be capable of monitoring the speed of rotation of the spool surface 12, the tank 10, the motorized pump 20, and/or the air compressor 5 to detect if obstructions or other difficulties may inhibit the cord from smoothly winding around the spool surface 12. In such situations where obstructions or other issues are detected, the pump 20 motor may reduce its speed or stop entirely.

In some examples the drive belt assembly 22 also includes a second drive belt 26 that wraps around an outer diameter of the drive pulley 25. The drive belt 26 is mechanically arranged with different sized pulleys such that the drive belt 26 can provide speed reduction and torque for the motorized pump.

Referring again to FIG. 1, some examples of an the air compressor 5 include a combined motor brush holder 21 and brush assembly 24 that provide support for the rotation of the spool 12. In this example, a stationary side 24 of the brush assembly also provides support for rotation of the spool 12. For example, the motor may be able to rest on an interior spool surface or ledge that is a part of the brush holder 21 and/or the brush assembly 24.

In some approaches, a system of brush and/or slip rings at the end of the motor assembly 20 transfers power from a power source (e.g., a power cord attached to the stationary frame) to the pump 20 motor, to a control board, and to an electrical receptacle of an adaptor assembly 40, which will be described below with respect to FIGS. 3-7.

FIGS. 3A and 3B show a cord assembly 30 wound around the spool surface 12 of the air compression assembly 1. More specifically, FIG. 3A shows the air compressor assembly 1 standing in a vertical position, and FIG. 3B shows the air compressor assembly 1 lying in a horizontal position with a portion of the cord assembly 30 unwound or pulled out from the spool surface 12.

Figure 4:
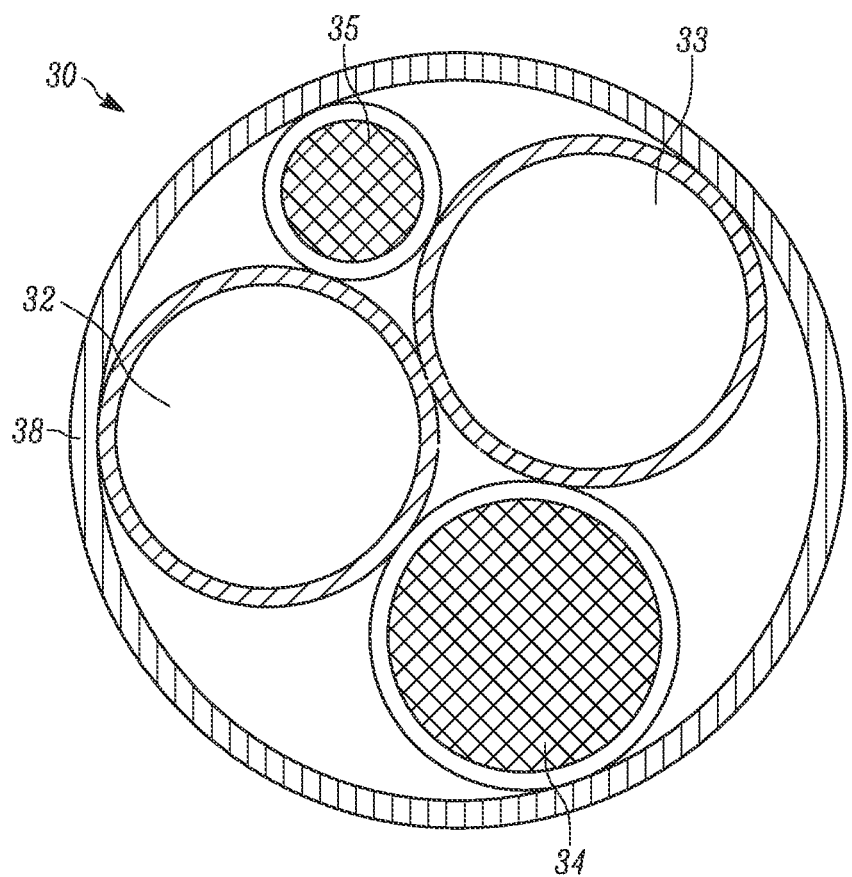
FIG. 4 shows a cross section of a cord assembly used in connection with examples of the described air compressor assembly.

The cord assembly 30 includes a first end (not shown) that connects to the air compressor 5 and a second end 31 that connects to an adaptor 40. A cross section of an exemplary cord assembly 30 is shown in FIG. 4.

The cord assembly 30 includes a hose 32, which is in fluid communication with the air compressor 5 (e.g., in communication with one or both of the pump 20 or the tank 10). The hose 32 has a hollow portion surrounded by a wall that allows air to flow between ends of the cord assembly 30.

The hose 32 delivers air from the air compressor assembly 1 to the second end 31 of the cord assembly 30, for example, so as to provide air to an attached air-powered tool or to an inflatable apparatus. For example, the hose 32 can be connected to a quick connection coupling 42 (see FIG. 3B) on the adaptor 40 that allows air-powered tools or devices to connect to the air compressor 5.

In some embodiments, the hose 32 (or an extension of the hose 32) connects to a drain valve, tire chuck, or other air release valve that can be attached to an opening or inflation valve for an inflatable apparatus so that the air compressor 5 can be used to inflate the inflatable apparatus. In other embodiments, the cord assembly includes a separate drain tube 33 or drain hose that also connects the tank 10 of the air compressor with the end 31 of the cord assembly 30. The drain tube 33 can be used to remotely drain water and air from the tank 10 or to provide a blast of air.

The cord assembly 30 also includes one or more electrical power cords configured to supply electrical power. For example, the cord assembly 30 can include a high voltage power cord 34 that conducts electricity between the air compressor 5 and the end 31 of the cord assembly 30. The high voltage power cord 34 supplies high voltage power (e.g., from a 120 volt power outlet) to an electrical receptacle 41 (see FIGS. 5-7) on the adaptor 40.

The cord assembly 30 can also include a low voltage power cord 35 that conducts electricity between the air compressor 5 and the end 31 of the cord assembly 30. The low voltage power cord 35 can be used to provide communication signals and to provide power for various features of the adaptor 40 and/or the air compressor 5.

A sheath or jacket 38 surrounds the hoses/cords and other lines of the cord assembly 30. The jacket 38 surrounds all or a portion of the cord assembly 30 such that the cord assembly 30 effectively handles as if it were a single cable or cord.

FIGS. 1, 3A, and 3B show the structural frame 50 of the air compressor assembly 1. As noted previously, the frame 50 facilitates winding of a cord assembly around the spool 12. For example, the frame 50 can include a spool cover 51 that guides and retains the cord assembly 30 on the spool surface 12.

Some examples of the frame 50 include a cord guide management system 54. The cord guide management system 54 includes a slideable guide 55 that moves along the spool 12 to manage placement of the cord assembly 30 during the winding and/or unwinding process.

As shown in FIGS. 3A and 3B, the cord assembly 30 can be wound around the spool 12 of the air compressor 5. The frame 50 provides utility and flexibility in the use and operation of the air compressor assembly 1.

The frame can be arranged about the air compressor 5 so that the pump 20 and tank 10 of the air compressor 5 lift off of the surface when the air compressor assembly 1 rests on a generally flat surface. ("Generally flat" refers to any surface that air compressor assembly 1 can rest upon without being expected to slide, wobble, tip, fall, or collapse.) In this manner, the spool surface 12 can be free to rotate without being obstructed by the ground or surface that the air compressor assembly 1 rests upon.

In some examples, frame 50 has support feet 56 (e.g., rubber feet) that provide frictional stability and support when the air compressor assembly 1 is resting on a relatively horizontal surface. The support feet 56 can be arranged in multiple configurations so that at least some feet 56 contact the resting surface when the air compressor assembly 1 is standing in a vertical position, as shown in FIG. 3A, and when the air compressor assembly 1 is lying in a horizontal position, as shown in FIG. 3B.

A portion of the frame 50 is formed of a cylindrical or tubular construction (e.g., tubes, pipes, or the like). In this manner, the frame 50 can be easily grasped and carried. In some examples, the frame will comprise, or can by itself be used as, a handle thereby promoting easy grasping and transportation while also providing the rigid structure to support the air compressor assembly 1.

Some examples of the air compressor assembly 1 are capable of connecting with other tools, devices, and objects. For example, an adaptor 40, or a "remote user assembly," provided at the end 31 of the cord assembly 30 can be used to connect the air compressor assembly with various tools, devices, equipment, or other objects.

Figure 5:
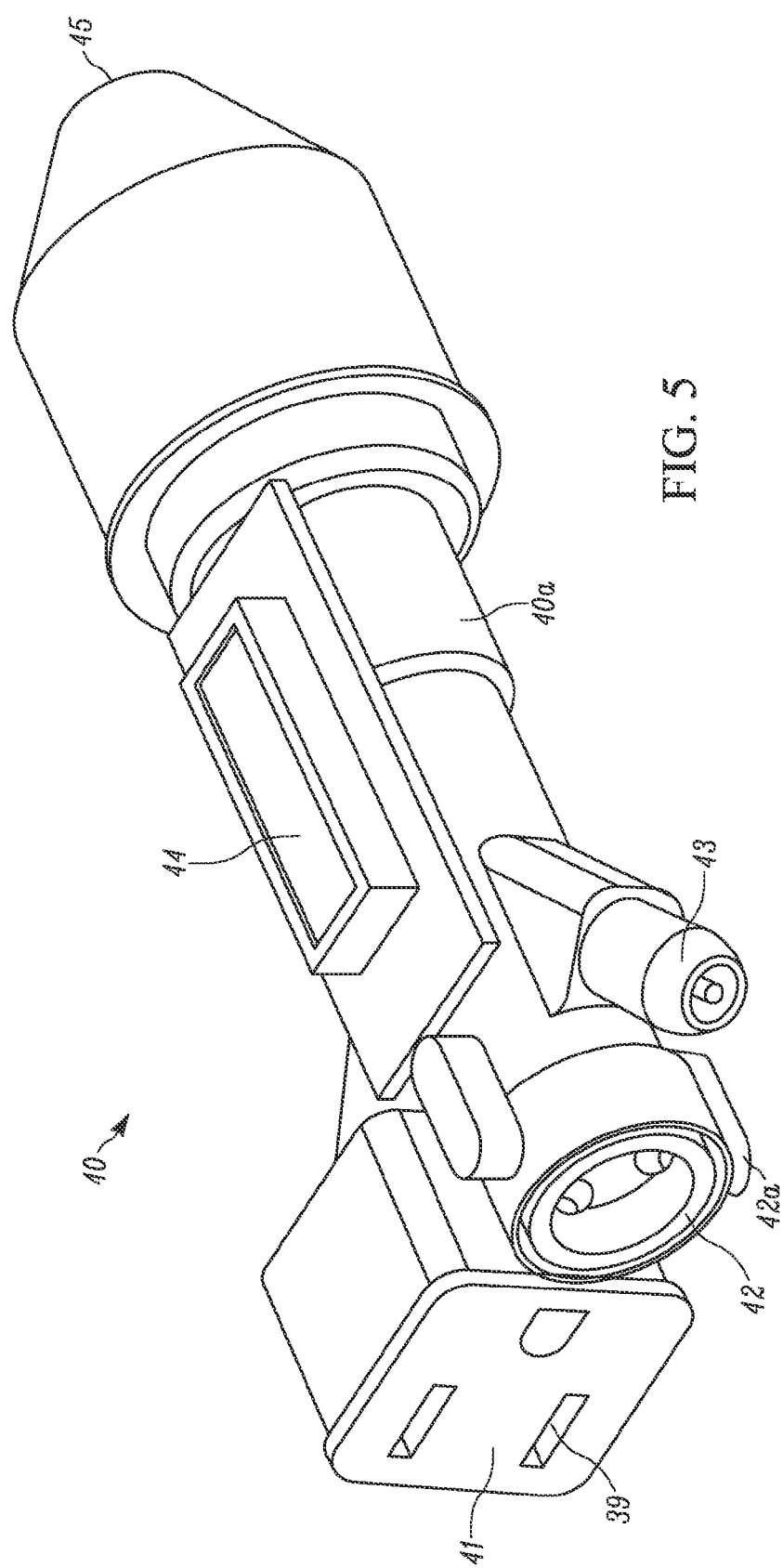
FIGS. 5 and 6 present perspective views of examples of adaptors used with at least one example of an air compressor assembly described herein.
Figure 6:
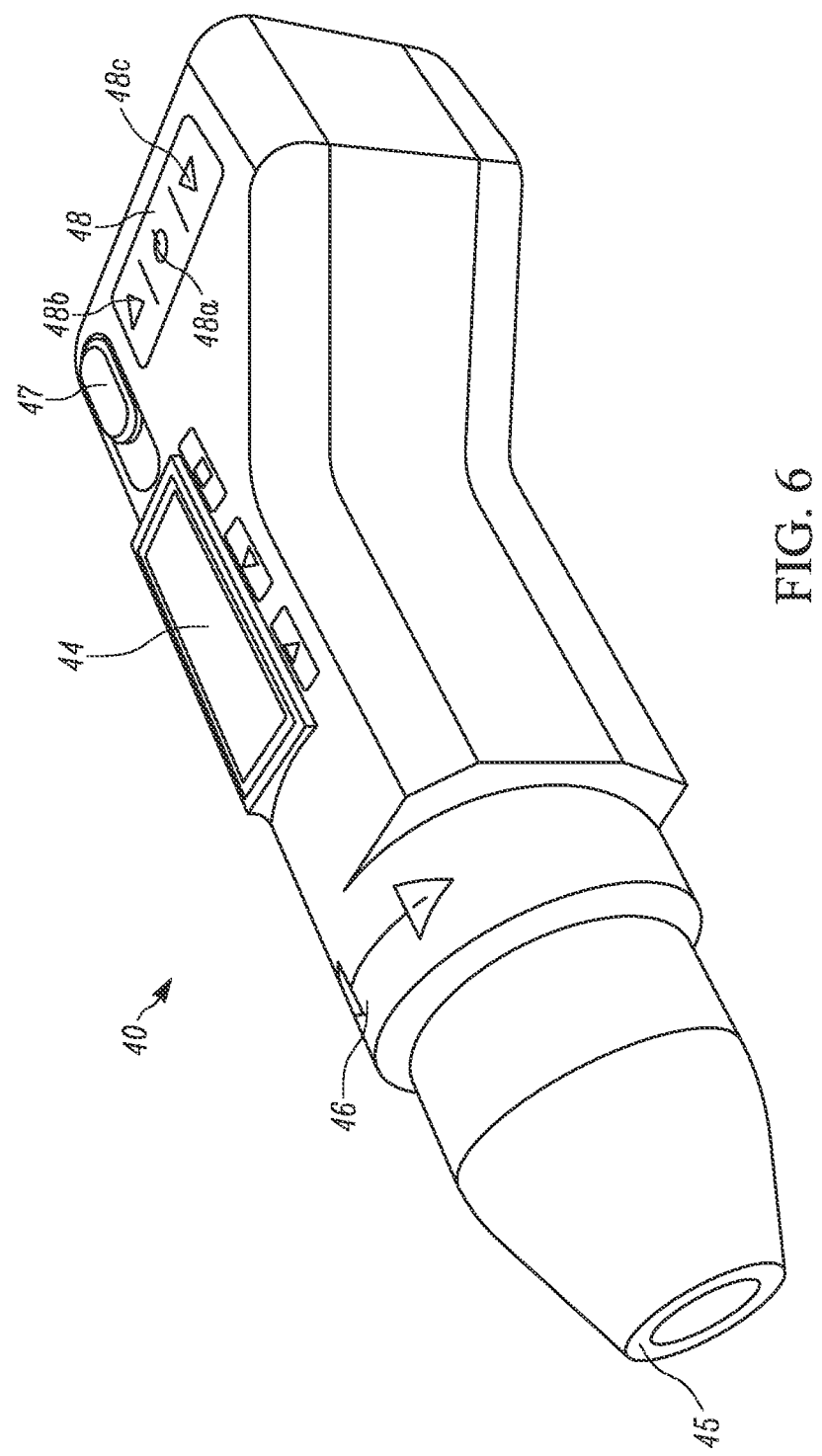
Figure 7:
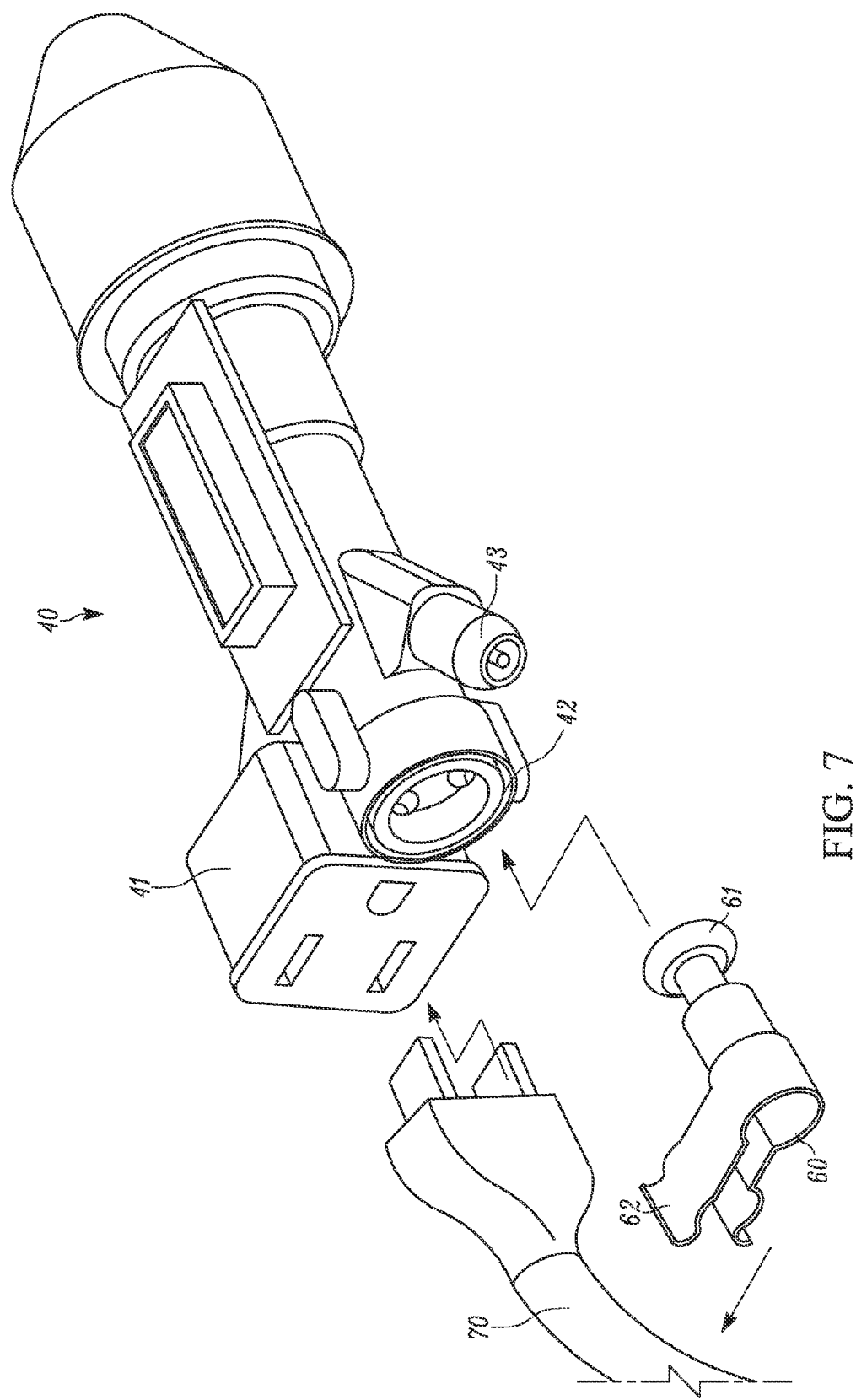
FIG. 7 shows a perspective view of an example of an adaptor with a retention device used with at least one example of an air compressor assembly described herein.

FIGS. 5-7 show various examples of an adaptor 40 that can be used in connection with air compressor assemblies described herein. As shown in FIG. 5, an example adaptor 40 includes an adaptor housing 40a and an interface 39 that allows for various tools, devices, or other objects to connect to the air compressor assembly 1.

FIG. 5 shows an interface 39 that includes an electrical receptacle 41. The electrical receptacle can be, for example, a 120 volt outlet, and is in electrical connection with the high voltage power cord 34 of the cord assembly 30.

The function of the electrical receptacle 41 can vary depending on the intended use. For example, the electrical receptacle 41 may be either an A/C power outlet or a D/C power outlet. In some examples, the electrical receptacle 41 is or comprises a 120 V power outlet so that standard 120 volt power cords can be plugged into the receptacle 41 and used to power connected devices.

Interface 39 is also shown having an air coupling 42 for establishing an air tight connection between the fluid hose 32 of the cord assembly 30 and an air-powered tool that connects to the air compressor assembly 1. In some examples, the air coupling is a quick connect that allows for easy attachment and detachment of certain air-powered tools equipped with fittings for attaching to the quick connect.

The air coupling 42 allows for various air-powered tools and devices to be connected to the air compressor assembly 1. In the illustrated example, the air coupling 42 allows for fast, simple connections via a quick connect/disconnect retention ring 42a. In this manner, a tool can be attached by pressing down the retention ring 42a and inserting a mating component of the tool into the air coupling 42 orifice.

Upon release of the retention ring 42a, the tool is held sturdily in place, attached to the air compressor assembly 1. To remove the tool, the retention ring 42a is pressed down to unlock the quick connect 42, thereby allowing removal of the tool.

The air coupling 42 can include a check valve so that air can only flow in one direction through the hose. Other quick connect configurations known in the art can also be applied as the air coupling 42.

The illustrated adaptor 40 includes a tire chuck 43. The tire chuck can be in fluid connection with hose 32 of the cord assembly 30, the drain tube 33, or with another air delivery line. The tire chuck 43 can be used to insert into a valve stem of a tire (or any inflatable object) to inflate the tire (or inflatable object). The tire chuck assembly 43 can include a regulator that regulates the output of air pressure from the adaptor assembly 43.

In some examples the adaptor 40 also includes a drain valve connected to the drain tube 33 of the cord assembly 30. The drain valve allows liquid and/or air to be expunged from the air reservoir tank 10 through the drain tube. This feature allows a user to expunge the air-reservoir tank 10 without having to handle the air compression assembly 1 directly.

Some examples of adaptor 40 include a push-button device that controls the draining of air and/or liquid from the air reservoir tank 10. In some embodiments, pressing the push-button device results in a blast of air being expelled from the adaptor 40.

Operation interface 44 includes a display screen, such as an LCD display, and a logic board, such as a printed circuit board. In this manner, the operation interface 44 provides information to a user regarding the output and/or operation of the adaptor 40 and/or air compressor assembly 1.

For example, the operation interface 44 can provide a digital readout of the air pressure in a tire being filled by the tire chuck assembly 43. In some embodiments, the operation interface 44 can provide information about the air reservoir tank 10 and the output pressure of the air compressor assembly 1. In some examples, the operation interface 44 can also be used to display metrics of the motor/pump metrics, which, for example, can include motor run hours, diagnostics, warnings on increasing current draw, check wear on the brushes, and the like.

FIG. 6 shows another embodiment of the adaptor 40. The adaptor 40 has a cord attachment interface 45 configured to attach with a cord assembly 30, as described herein. The attachment interface 45 in this example includes a high voltage attachment mechanism for providing power to the electrical receptacle, a low voltage attachment mechanism for providing communication and power to the operation interface, a hose attachment mechanism, and a tank drain connection mechanism. Other attachments or embodiments of an attachment interface 45 are possible.

The illustrated adaptor 40 includes a regulator adjustment knob 46 along the attachment interface 45. This regulator adjustment knob 46 can be used to regulate the flow of air through the cord assembly 30. For example, turning the regulator adjustment knob 46 in one direction can increase the flow of air through the cord assembly 30, while rotating knob 56 in the opposite direction restricts or decreases the flow of air through the cord assembly 30.

The adaptor 40 also includes a sliding switch 47, which can be configured to engage/retract a spring loaded quick connector retention ring, for example, as depicted in FIG. 5 and described above. In this manner, the sliding switch 47 can be used to engage and/or disengage an air-powered tool from the air coupling 42 of the adaptor 40.

Some examples of adaptor 40 also include a control interface 48 for operating various functionality of the adaptor 40 and/or the air compressor assembly 1. The control interface 48 includes one or more control and/or setting buttons and/or keys. For example, the control interface 48 includes an on/off button 48a for turning the air compressor 1 on and/or off. In some embodiments, the control interface 48 is connected with or integrated into the operation interface 44.

The illustrated control interface 48 also includes an LED light button 48b for turning on/off an integrated LED light source positioned on the adaptor 40. The control interface 48 also includes a retraction button 48c to automatically commence the self-retraction process, winding the cord assembly 30 around the spool 12 of the air compressor assembly 1 as described herein.

Some examples of adaptor 40 will include a variety of other features not shown, such as an LED light system, a drain valve, a pressure gauge, or a bottle opener.

FIG. 7 shows another example of an adaptor assembly 40 connecting to an electrical power cord 70. As shown, electrical power cord 70 can be plugged into the electrical receptacle 41 as described above. For example, electrical power cord 70 can plug into the electrical receptacle 41 in the same manner as if the electrical receptacle 41 was the outlet end of an extension cord.

A retention device 60 is designed to hold the power cord 70 to the adaptor 40 while plugged in. In this manner, tension on the cord 70 is reduced, limited, minimized, and/or eliminated so that tension does not cause the cord 70 to disengage from the electrical receptacle 41.

The illustrated retention device 60 includes a mating component 61 that is configured to be inserted into the air coupling 42 (e.g., quick connector) of the adaptor 40. Clip 62 grasps a portion of the cord 70. In this manner, tension applied to the cord 70 is at least in part transferred to the retention device 60, which is locked firmly in place via the air coupling 42. Thus, tension on the power cord 70 may not cause power cord 70 to become unplugged from the electrical receptacle 41.

The retention device 60 can also be used as a plug to prevent contaminants from entering the quick connector coupling 42 when not in use.

In some examples, the retention device 60 is a part of, or is attached to, the air compressor assembly 1. For example, the retention device 60 can be tethered, tied, or otherwise attached to the adaptor assembly 40 or the cord assembly 30 so that the retention device 60 hangs therefrom when not in use to prevent being misplaced. In other examples, the retention device is a separate, unattached component from the air compressor assembly 1.

Figure 8:
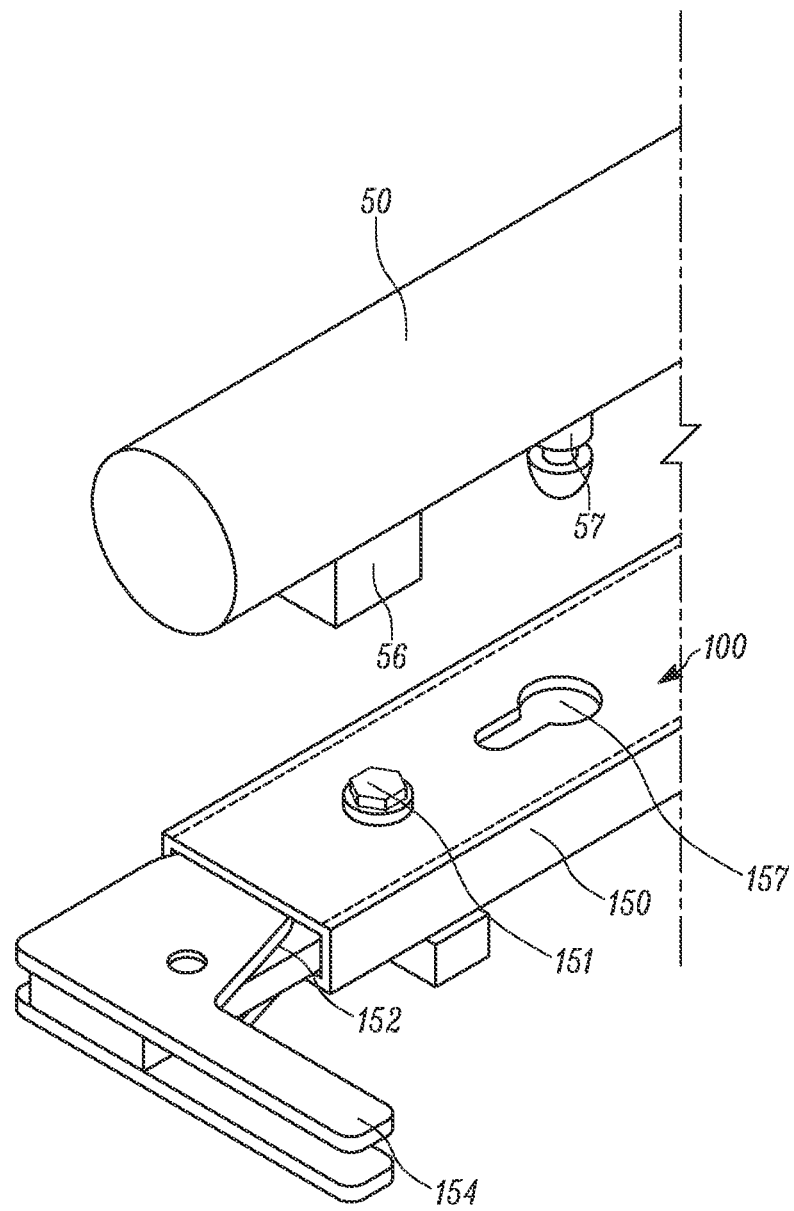
FIG. 8 shows a partial perspective view of an example of a mounting system for securing an air compressor assembly to a wall or ceiling.

Some examples of the air compressor assembly 1 can be fitted or mounted to a wall or ceiling to provide for easy storage. FIG. 8 shows a mounting system 100 for removably securing the air compressor assembly 1 to a wall or ceiling via the frame 50.

The mounting system 100 includes a mounting plate 150 with one or more mounting lag screws 151 that secure mounting plate 150 a wall or a ceiling. The mounting lag screws 151 can include or be used with a rubber washer/spacer/pad to isolate vibration that may occur during operation of the air compression assembly 1.

The mounting system 100 also includes a spring loaded locking mechanism 152 and a cam operated lever 154. The cam operated lever 154 enables an easy release mounting solution to accommodate wall or ceiling mounting while still allowing easy portability of the air compression assembly 1.

The illustrated openings 157 in the mounting plate 150 correspond with mounting pegs 57 on the frame 50 of the air compression assembly 1. In this manner, the pegs 57 can be slid into the openings 157 so that the frame 50 can be removably secured to the mounting system 100.

Mounting to the wall or ceiling allows the air compressor assembly 1 to utilize space that would otherwise be typically unused, thereby alleviating the need for the air supply assembly 1 to occupy valuable storage space on shelves or floor when not in use. Further, mounting on the wall or ceiling also allows the air compressor assembly 1 to be mounted in a location that is convenient or accessible without the compressor having to be moved. For example, the air compressor assembly 1 can be mounted to a ceiling or wall in a garage or workshop, where all or a majority of the user's air compressor tasks are typically performed.

The mounted air compressor assembly 1 then can be used to provide air and/or power to locations within reach of the cord assembly 30 without having to dismount and move the air compressor assembly 1. This may alleviate the need to involve extension cord(s) when performing tasks requiring compressed air or power in spaces like garages or workshops. When the project is complete, a user can put away the air compressor assembly 1 by simply pressing a button on the adaptor assembly to commence the self-retraction or winding process.

The presently described air compression assembly 1 offers an air compressor that can be smaller in size, weight, and bulkiness when compared to other compressor units. The air compressor assembly 1 can also provide a reduction in costs, both in the form of a reduced cost of the compressor itself, and in the elimination of other tools and equipment that needs to be purchased for operation therewith.

The air compressor assembly 1 can also be used without occupying significant storage space. The air compressor assembly offers a hose and power management system that is convenient and efficient and that sets up/tears down quickly.

The air compressor assembly 1 can alleviate leaking that can be caused by dynamic seals, which can be a problem common with other air compressors.

The air compressor assembly 1 can also provide a convenient power cord and compressed air hose reel in one convenient unit that minimizes the amount of cords and lines interfering with the workplace. Further, the air compressor assembly 1 provides an easy to use retention device that reduces problems that can be caused by tension on a power cord inserted into a power outlet on during use.

Those skilled in the art will recognize that a wide variety of modifications, alterations, and combinations can be made with respect to the above described embodiments without departing from the scope of the invention as set forth in the claims, and that such modifications, alterations, and combinations are to be viewed as being within the ambit of the inventive concept.

The invention claimed is:

1. A self-retracting air compressor comprising:
   a pump device having a motor, the motor configured to drive in a pumping direction and in a winding direction;
   a reservoir tank in fluid communication with the pump device; and
   a cord assembly configured to supply air and electrical power from the pump device, the cord assembly having a first end attached to the pump device, the cord assembly comprising a fluid hose in fluid communication with the pump device, a power cord in electrical communication with the pump device, and a jacket that surrounds at least a portion of the fluid hose and the power cord;
   wherein the pump device is configured to pump air during operation of the motor in the pumping direction, and the cord assembly is configured to self-retract by winding around an outer periphery of the reservoir tank during operation of the motor in the winding direction.

2. The self-retracting air compressor of claim 1, wherein the cord assembly further comprises a drain tube configured to expunge fluid from the reservoir tank, and wherein the jacket surrounds at least a portion of the drain tube.

3. The self-retracting air compressor of claim 1, wherein the cord assembly comprises a second end attached to an adaptor, the adaptor having an interface configured to connect objects to the air compressor, the interface having an air coupling configured to establish an air tight connection between the fluid hose and a connected air-powered tool.

4. The self-retracting air compressor of claim 3, wherein the interface further comprises an electrical receptacle configured to establish an electrical connection between the power cord and a connected electrical-powered object.

5. The self-retracting air compressor of claim 3, wherein the adaptor further comprises a drain valve connected to a drain tube configured to expunge fluid from the reservoir tank.

6. The self-retracting air compressor of claim 4, further comprising a retention device having a coupling portion configured to connect to the air coupling of the adaptor and a clip portion configured to grasp a portion of a cord connected to the electrical receptacle, wherein the retention device is configured to limit tension the cord and the adaptor.

7. An air compressor assembly comprising:
   an air compressor having a central axis, the air compressor comprising:

a pump having a motor, the pump positioned about the central axis of the air compressor, the motor configured to drive in a pumping direction to effect the pump to pump air and in a winding direction; and a reservoir tank in fluid communication with the pump, the reservoir tank having a torus shape that circumscribes the pump;

a cord assembly having a first end attached to the air compressor and a second end, the cord assembly a configured to supply at least one of air or electrical power from the air compressor;

a spool surface surrounding at least a portion of the air compressor, the spool surface configured to receive a wound portion of the cord assembly;

a drive system configured to control winding of the cord assembly about the spool surface; and a frame positioned about the air compressor, the frame having a contact surface in proximity to the drive system;

wherein the drive system is configured to engage with the contact surface of the frame in response to the motor operating in the winding direction, wherein operating the motor in the winding direction effects rotation of the spool surface about the central axis, thereby winding the cord assembly about the spool cover, and wherein the drive system is configured to disengage from the frame in response to the motor operating the pumping direction.

8. The air compressor assembly of claim 7, wherein the cord assembly comprises:

a fluid hose configured to transmit fluid between the first and second ends of the cord assembly;

an electrical power cord configured to conduct electricity between the first and second ends of the cord assembly; and a jacket surrounding at least a portion of the fluid hose and the electrical power cord so that the surrounded portion of the cord assembly winds around the spool surface as a single cord.

9. The air compressor assembly of claim 8, further comprising:

an adaptor attachable to the second end of the cord assembly, the adaptor comprising:

an electrical receptacle in electrical connection with the electrical power cord of the cord assembly, the electrical receptacle configured to establish an electrical connection between the power cord and a connected electrical-powered object; and an air coupling in fluid communication with the fluid hose, the air coupling configured to establish an air tight connection between the fluid hose and a connected air-powered tool.

10. The air compressor assembly of claim 7, wherein the frame is arranged about air compressor so that the pump and tank of an air compressor assembly resting on a generally flat surface are lifted off of the generally flat surface.

11. The air compressor assembly of claim 10, wherein the frame further comprises a handle portion that facilitates grasping and transportation of the air compressor assembly.

12. The air compressor assembly of claim 10, wherein the frame comprises a plurality of support feet, wherein the support feet are arranged so that a plurality of support feet contact a resting surface while the air compressor assembly is resting in a horizontal position, and so that a plurality of support feet contact the resting surface while the air compressor assembly is resting in a vertical position.

13. The air compressor assembly of claim 7, wherein the frame comprises a spool cover configured to maintain a wound portion of the cord assembly in contact with the spool surface.

14. The air compressor assembly of claim 7, wherein the drive system comprises a spring mechanism configured to disengage the drive system from the frame while the motor is operating.

15. The air compressor assembly of claim 7, wherein the drive system further comprises a brush assembly circumscribed by the reservoir tank, wherein the brush assembly is configured to support rotation of the reservoir during operation of the motor in the winding direction.

16. The air compressor assembly of claim 7, wherein the drive system further comprises a drive pulley and a drive belt wrapped around the pulley, wherein the drive belt is mechanically arranged to provide at least one of speed reduction or torque for the pump.

17. An adaptor for use with an air compressor, the air compressor having a pump, a tank, and a cord assembly having a fluid hose, a high voltage power source, a low voltage power source, and a drain tube, the adaptor comprising:

an electrical receptacle in electrical connection with the high voltage power cord, the electrical receptacle configured to establish an electrical connection between the high voltage power cord and a connected object, a quick connect coupling in fluid communication with the fluid hose, the quick connect coupling configured to establish an air tight connection between the fluid hose and a connected air-powered tool; and a drain valve in fluid connection with the drain tube of the cord assembly, wherein the drain valve comprises a tire chuck configured to supply air from the fluid hose to a tire.

18. The adaptor of claim 17, further comprising a drain switch, wherein the drain switch is configured to effect draining the tank and to effect discharge of air from the adaptor.

19. An adaptor for use with an air compressor, the air compressor having a pump, a tank, and a cord assembly having a fluid hose, a high voltage power source, a low voltage power source, and a drain tube, the adaptor comprising:

an electrical receptacle in electrical connection with the high voltage power cord, the electrical receptacle configured to establish an electrical connection between the high voltage power cord and a connected object, a quick connect coupling in fluid communication with the fluid hose, the quick connect coupling configured to establish an air tight connection between the fluid hose and a connected air-powered tool;

a drain valve in fluid connection with the drain tube of the cord assembly; and an LED light source in electrical communication with the air compressor, wherein the LED light source is configured to receive electrical power from the low voltage power supply source of the cord assembly.

20. An adaptor for use with an air compressor, the air compressor having a pump, a tank, and a cord assembly having a fluid hose, a high voltage power source, a low voltage power source, and a drain tube, the adaptor comprising:

an electrical receptacle in electrical connection with the high voltage power cord, the electrical receptacle configured to establish an electrical connection between the high voltage power cord and a connected object, a quick connect coupling in fluid communication with the fluid hose, the quick connect coupling configured to establish an air tight connection between the fluid hose and a connected air-powered tool;

a drain valve in fluid connection with the drain tube of the cord assembly; and an operation interface having a digital display, wherein the digital display is configured to receive electrical power from the low voltage power supply source of the cord assembly, and wherein the digital display is configured to display information pertaining to operation of the air compressor.

21. The adaptor of claim 20, wherein the information pertaining to operation of the air compressor includes at least one of:

air pressure measured at an outlet of an air-powered tool connected to an air coupling;

air pressure measured within the reservoir tank;

connection status of an electrical-powered object connected to the electrical receptacle; and operating status of the air compressor.

22. An adaptor for use with an air compressor, the air compressor having a pump, a tank, and a cord assembly having a fluid hose, a high voltage power source, a low voltage power source, and a drain tube, the adaptor comprising:

an electrical receptacle in electrical connection with the high voltage power cord, the electrical receptacle configured to establish an electrical connection between the high voltage power cord and a connected object, a quick connect coupling in fluid communication with the fluid hose, the quick connect coupling configured to establish an air tight connection between the fluid hose and a connected air-powered tool;

a drain valve in fluid connection with the drain tube of the cord assembly; and a retention device having a coupling portion configured to connect to an air coupling of the adaptor and a clip portion configured to grasp a portion of a cord connected to the electrical receptacle, wherein the retention device is configured to minimize tension between the connected cord and the adaptor.

* * * * *